(12) United States Patent
Sunada et al.

(10) Patent No.: US 10,379,691 B2
(45) Date of Patent: Aug. 13, 2019

(54) OPTICALLY TRANSPARENT CONDUCTIVE MATERIAL

(71) Applicant: MITSUBISHI PAPER MILLS LIMITED, Sumida-ku, Tokyo (JP)

(72) Inventors: Kazuhiko Sunada, Sumida-ku (JP); Takenobu Yoshiki, Sumida-ku (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 91 days.

(21) Appl. No.: 15/525,207

(22) PCT Filed: Nov. 18, 2015

(86) PCT No.: PCT/JP2015/082370
§ 371 (c)(1),
(2) Date: May 8, 2017

(87) PCT Pub. No.: WO2016/084673
PCT Pub. Date: Jun. 2, 2016

(65) Prior Publication Data
US 2017/0322651 A1    Nov. 9, 2017

(30) Foreign Application Priority Data

Nov. 26, 2014 (JP) .................................. 2014-238455

(51) Int. Cl.
 *G06F 3/044*    (2006.01)
 *H01B 5/14*    (2006.01)
(52) U.S. Cl.
 CPC ............ *G06F 3/0448* (2019.05); *G06F 3/044* (2013.01); *G06F 3/0446* (2019.05); *H01B 5/14* (2013.01);
(Continued)

(58) Field of Classification Search
 CPC . H01B 5/14; G06F 3/041; G06F 3/044; G06F 2203/04112; G06F 2203/04103
 See application file for complete search history.

(56) References Cited

U.S. PATENT DOCUMENTS 5,850,229 A * 12/1998 Edelsbrunner .......... G06T 13/20
 345/473
9,541,785 B2 * 1/2017 Iwami ..................... G06F 3/044
(Continued)

FOREIGN PATENT DOCUMENTS

JP   2011-216377   10/2011
JP   2013-030378    2/2013
(Continued)

OTHER PUBLICATIONS

Mathematical Models of Territories—Introduction to Mathematical Engineering through Voronoi diagrams—(published by Kyoritsu Shuppan in Feb. 2009).

*Primary Examiner* — Patrick F Marinelli
(74) *Attorney, Agent, or Firm* — Venable LLP

(57) ABSTRACT

Provided is an optically transparent conductive material which does not cause moire even when placed over a liquid crystal display, and has a favorable optical transparency and a high reliability. The optically transparent conductive material has, on an optically transparent support, an optically transparent conductive layer having a sensor part electrically connected to a terminal part and a dummy part not electrically connected to the terminal part, and the sensor part and/or the dummy part is formed of a metal pattern having a mesh shape obtained by enlarging or reducing a Voronoi diagram in an arbitrary direction.

10 Claims, 5 Drawing Sheets

(52) U.S. Cl.
CPC ............. *G06F 2203/04103* (2013.01); *G06F 2203/04112* (2013.01)

(56) References Cited

U.S. PATENT DOCUMENTS

| | | | | |
|---|---|---|---|---|
| 9,652,563 | B2* | 5/2017 | Chang | G06F 17/50 |
| 9,736,933 | B2* | 8/2017 | Iwami | B32B 7/02 |
| 9,836,176 | B1* | 12/2017 | Yoshiki | G06F 3/044 |
| 9,946,426 | B2* | 4/2018 | Chen | G06F 3/044 |
| 9,983,754 | B2* | 5/2018 | Ishii | G06F 3/044 |
| 2005/0248567 | A1* | 11/2005 | Kim | G06F 19/26 345/419 |
| 2009/0097073 | A1* | 4/2009 | Kawamura | H04N 1/405 358/3.06 |
| 2013/0028503 | A1 | 1/2013 | Wakui et al. | |
| 2013/0215067 | A1 | 8/2013 | Hwang et al. | |
| 2013/0341079 | A1* | 12/2013 | Hwang | G02B 5/1866 174/268 |
| 2014/0055380 | A1* | 2/2014 | Han | G06F 3/041 345/173 |
| 2014/0111711 | A1* | 4/2014 | Iwami | B32B 7/02 349/12 |
| 2014/0184552 | A1* | 7/2014 | Tanemura | G06F 3/0416 345/174 |
| 2014/0218325 | A1* | 8/2014 | Iwami | B32B 7/02 345/173 |
| 2014/0218642 | A1* | 8/2014 | Iwami | G06F 3/044 349/12 |
| 2014/0332262 | A1 | 11/2014 | Yoshiki | |
| 2014/0333555 | A1* | 11/2014 | Oh | G06F 3/044 345/173 |
| 2014/0347319 | A1* | 11/2014 | Lin | G06F 3/044 345/174 |
| 2015/0098664 | A1* | 4/2015 | Minamihara | G06T 11/60 382/284 |
| 2016/0149572 | A1* | 5/2016 | Chen | G06F 3/044 345/173 |
| 2016/0224992 | A1* | 8/2016 | Powell | G06Q 30/0201 |
| 2017/0010714 | A1* | 1/2017 | Lee | G06F 3/0416 |
| 2017/0010715 | A1* | 1/2017 | Lee | G06F 3/044 |
| 2017/0031482 | A1* | 2/2017 | Yoshiki | G06F 3/044 |
| 2017/0139504 | A1* | 5/2017 | Sunada | G06F 3/044 |
| 2017/0177121 | A1* | 6/2017 | Ishii | G06F 3/044 |
| 2017/0221196 | A1* | 8/2017 | Yamaguchi | G06F 3/044 |
| 2017/0322651 | A1* | 11/2017 | Sunada | G06F 3/044 |
| 2017/0344151 | A1* | 11/2017 | Yoshiki | G06F 3/044 |
| 2018/0018047 | A1* | 1/2018 | Iwami | G06F 3/041 |
| 2018/0081464 | A1* | 3/2018 | Sunada | G06F 3/044 |
| 2018/0107304 | A1* | 4/2018 | Hara | G06F 3/044 |
| 2018/0232080 | A1* | 8/2018 | Iwami | G06F 3/044 |
| 2018/0239461 | A1* | 8/2018 | Yoshiki | G06F 3/044 |

FOREIGN PATENT DOCUMENTS

| | | |
|---|---|---|
| JP | 2013-037682 | 2/2013 |
| JP | 2013-037683 | 2/2013 |
| JP | 2013-540331 | 10/2013 |
| JP | 2014-041589 | 6/2014 |

\* cited by examiner (a)

(b)

OPTICALLY TRANSPARENT CONDUCTIVE MATERIAL

This application is a national phase of PCT Application No. PCT/JP2015/082370 filed Nov. 18, 2015, which in turn claims benefit of Japanese Patent Application No. 2014-238455 filed Nov. 26, 2014.

TECHNICAL FIELD

The present invention relates to an optically transparent conductive material mainly used for touchscreens and, in particular, to an optically transparent conductive material preferably used for optically transparent electrodes of projected capacitive touchscreens.

BACKGROUND ART

In electronic devices, such as personal digital assistants (PDAs), laptop computers, office automation equipment, medical equipment, and car navigation systems, touchscreens are widely used as their display screens that also serve as input means.

There are a variety of touchscreens that utilize different position detection technologies, such as optical, ultrasonic, surface capacitive, projected capacitive, and resistive technologies. A resistive touchscreen has a configuration in which an optically transparent conductive material and a glass plate with an optically transparent conductive layer are separated by spacers and face each other so as to function as a touchsensor formed of an optically transparent electrode. A current is applied to the optically transparent conductive material and the voltage of the glass plate with an optically transparent conductive layer is measured. In contrast, a capacitive touchscreen has a basic configuration in which a touchsensor formed of an optically transparent electrode is an optically transparent conductive material having an optically transparent conductive layer provided on a support and there are no movable parts. Capacitive touchscreens are used in various applications due to their high durability and high light transmittance. Further, touchscreens utilizing projected capacitive technology allow simultaneous multipoint detection, and therefore are widely used for smartphones, tablet PCs, etc.

Conventionally, as an optically transparent conductive material used for optically transparent electrodes of touchscreens, those having an optically transparent conductive layer made of an ITO (indium tin oxide) film formed on a support have been used. However, there has been a problem of low optical transparency due to high refractive index and high surface light reflectivity of ITO conductive films. Another problem is that ITO conductive films have low flexibility and thus are prone to crack when bent, resulting in increased electric resistance of the optically transparent conductive material.

A known optically transparent conductive material as an alternative to the one having an optically transparent conductive layer formed of an ITO conductive film is an optically transparent conductive material having, as an optically transparent conductive layer, a mesh pattern of a metal thin line on an optically transparent support, in which pattern, for example, the line width, pitch, pattern shape, etc. are appropriately adjusted. This technology provides an optically transparent conductive material which maintains a high light transmittance and which has a high conductivity. Regarding the shape of the mesh pattern formed of metal thin lines (hereinafter also written as metal pattern), it is known that a repetition unit of any shape can be used. For example, in Patent Literature 1, a triangle, such as an equilateral triangle, an isosceles triangle, and a right triangle; a quadrangle, such as a square, a rectangle, a rhombus, a parallelogram, and a trapezoid; an (equilateral) n-sided polygon, such as an (equilateral) hexagon, an (equilateral) octagon, an (equilateral) dodecagon, and an (equilateral) icosagon; a circle; an ellipse; and a star, and a combinational pattern of two or more thereof are disclosed.

As a method for producing the above-mentioned optically transparent conductive material having a metal pattern, a semi-additive method for forming a metal mesh pattern, the method comprising making a thin catalyst layer and a base metal layer on a support, making a resist pattern on the catalyst layer, making a laminated metal layer in an opening of the resist by plating, and finally removing the resist layer and the base metal layer protected by the resist layer, is suggested.

Also, in recent years, a method in which a silver halide diffusion transfer process is employed using a silver halide photosensitive material as a precursor to a conductive material has been proposed. In this method, a silver halide photosensitive material (a conductive material precursor) having, on a support, a physical development nuclei layer and a silver halide emulsion layer in this order is subjected to exposure with use of a pattern and then to a reaction with a soluble silver halide forming agent and a reducing agent in an alkaline fluid to form a metal (silver) pattern. The patterning by the method can reproduce uniform line width. In addition, due to the highest conductivity of silver among all metals, a thinner line with a higher conductivity can be achieved as compared with other methods. An additional advantage is that a layer having a metal pattern obtained by this method has a higher flexibility, i.e. a longer flexing life as compared with an ITO conductive film.

When an optically transparent conductive material having, on an optically transparent support, such a metal pattern as described above is placed over a liquid crystal display, the cycle of the metal pattern and the cycle of the liquid crystal display element interfere with each other, causing a problem of moire. In recent years, liquid crystal displays of different resolutions have been used, which further complicates the problem of moire.

As a solution to this problem, suggested in Patent Literature 2, Patent Literature 3, Patent Literature 4, and Patent Literature 5 is a method for suppressing moire by the use of a traditional random pattern described in, for example, Non Patent Literature 1. Also, disclosed in Patent Literature is a method for producing a metal pattern, the method comprising a step of calculating an evaluation value based on the quantified noise characteristic of the metal pattern to reduce granular noise which appears when the metal pattern is placed over a liquid crystal display.

CITATION LIST

Patent Literature

Patent Literature 1: JP 2013-30378 A
Patent Literature 2: JP 2011-216377 A
Patent Literature 3: JP 2013-37683 A
Patent Literature 4: JP 2014-41589 A
Patent Literature 5: JP 2013-540331 T

Non Patent Literature

Non Patent Literature 1: Mathematical Models of Territories—Introduction to Mathematical Engineering through Voronoi diagrams—(published by Kyoritsu Shuppan in February, 2009)

SUMMARY OF INVENTION

Technical Problem

In the above-mentioned random metal pattern, a part where the distribution of the metal thin line is sparse and a part where the distribution is dense randomly appear. Therefore, for example, when a formed metal pattern is exposed to high-temperature and high-humidity conditions, a problem of reliability, e.g., variation of resistance values and occurrence of line breaks occasionally arises, especially in apart where the distribution of the metal thin line is sparse. Conceivable measures to solve this problem include increasing the overall density of the metal thin line, but since a metal thin line does not have optical transparency, the increased density leads to a significant decrease in optical transparency. For these reasons, an optically transparent conductive material which is satisfactory in both reliability and light transmittance has been desired.

An objective of the present invention is to provide an optically transparent conductive material which does not cause moire even when placed over a liquid crystal display and which has a favorable light transmittance and a high reliability.

Solution to Problem

The above objective is basically achieved by an optically transparent conductive material having, on an optically transparent support, an optically transparent conductive layer having a sensor part electrically connected to a terminal part and a dummy part not electrically connected to the terminal part, the sensor part and/or the dummy part being formed of a metal pattern having a mesh shape obtained by enlargement or reduction of a Voronoi diagram in an arbitrary direction.

The sensor part is formed of a column electrode having a contour shape extending in a first direction in the plane of the optically transparent conductive layer, and a plurality of column electrodes are arranged in a second direction in such a manner that every two sensor parts sandwich a dummy part. Preferred is that the direction of the enlargement or reduction is the first and/or the second direction, and more preferred is that the ratio of enlargement or reduction in the first direction is greater than the ratio of enlargement or reduction in the second direction. Also preferred is that the ratio of enlargement or reduction in an arbitrary direction is 0.3 to 5 (except for 1), and more preferred is that the ratio of enlargement or reduction in an arbitrary direction is 0.5 to 3 (except for 1).

Advantageous Effects of Invention

The present invention provides an optically transparent conductive material which does not cause moire even when placed over a liquid crystal display and which has a favorable light transmittance and a high reliability.

DESCRIPTION OF EMBODIMENTS

Hereinafter, the present invention will be described in detail with reference to drawings, but it is needless to say that the present invention is not limited to the embodiments described below and various alterations and modifications may be made without departing from the technical scope of the invention.

Figure 1:
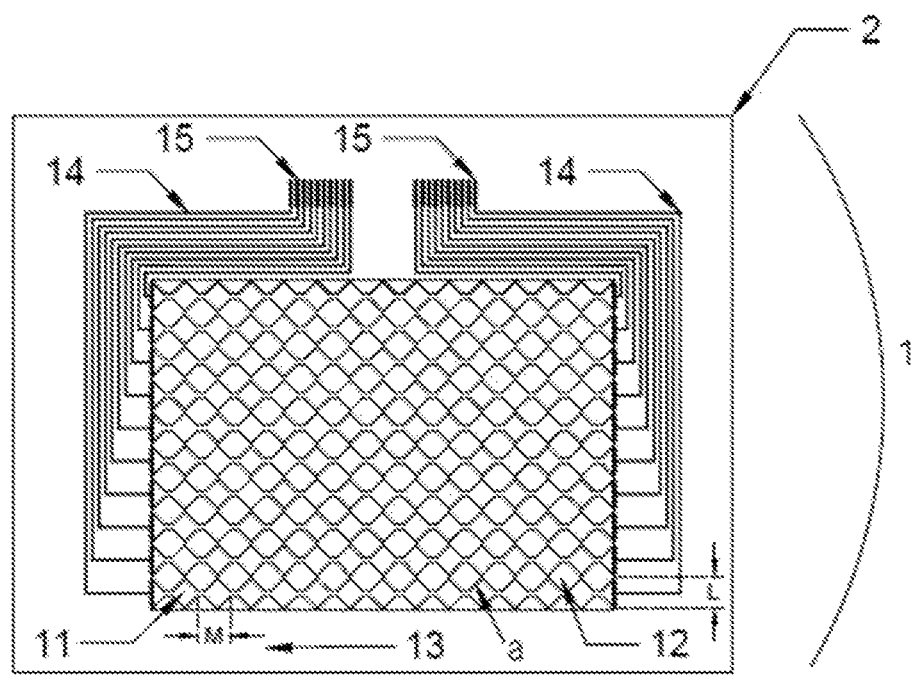
FIG. 1 is a schematic view showing an example of the optically transparent conductive material of the present invention.

FIG. 1 is a schematic view showing an example of the optically transparent conductive material of the present invention. In FIG. 1, an optically transparent conductive material 1 has, on at least one surface of an optically transparent support 2, a sensor part 11 and a dummy part 12 formed of a metal pattern having a mesh shape, a peripheral wire part 14, a terminal part 15, and a non-image part 13 not having any pattern. The regions of the sensor part 11 and the dummy part 12, which are formed of a metal pattern having a mesh shape, are conveniently shown by an outline a (non-existent line). The outline a is, as described later, also a line connecting line breaks provided on the metal pattern having a mesh shape for forming a plurality of sensor parts.

The sensor part 11 is electrically connected, via a peripheral wiring part 14, to a terminal part 15. By electrically connecting the terminal part 15 to the outside, the changes in capacitance detected by the sensor part 11 can be captured. Meanwhile, metal patterns not electrically connected to the terminal part 15 all serve as dummy parts 12 in the present invention. In the present invention, the peripheral wiring part 14 and the terminal part 15 need not particularly have optical transparency, and therefore may either be a solid pattern (a filled pattern without optical transparency) or be such a metal mesh pattern having optical transparency as the sensor part 11 and the dummy part 12.

In FIG. 1, the sensor parts 11 of the optically transparent conductive material 1 are column electrodes of each of which the contour shape extends in a first direction (x direction in the figure) in the plane of the optically transparent conductive layer. The column electrodes of the sensor parts 11 are arranged in a second direction (y direction in the figure) in such a manner that every two sensor parts sandwich a dummy part 12, in the plane of the optically transparent conductive layer. The x direction and the y direction are preferably perpendicular to each other. The columns of the sensor parts 11 are preferably arranged at a certain cycle L in the second direction (y direction) as in FIG. 1. The cycle L of the sensor parts 11 may be set at any length in such a range that the resolution appropriate for a touch sensor can be maintained. The width of the contour shape of the sensor part 11 may be constant, but it is also possible that the contour shape has a pattern cycle in the first direction (the x direction) as shown in FIG. 1. FIG. 1 shows an example in which the shape of the sensor part 11 is narrowed at a cycle N (an example of a diamond pattern). The width of the sensor part 11 (the width of the unnarrowed portions in the diamond pattern) may also be set at any value in such a range that the resolution appropriate for a touch sensor can be maintained, and accordingly the shape and the width of the dummy part 12 may also be freely set.

Figure 2:
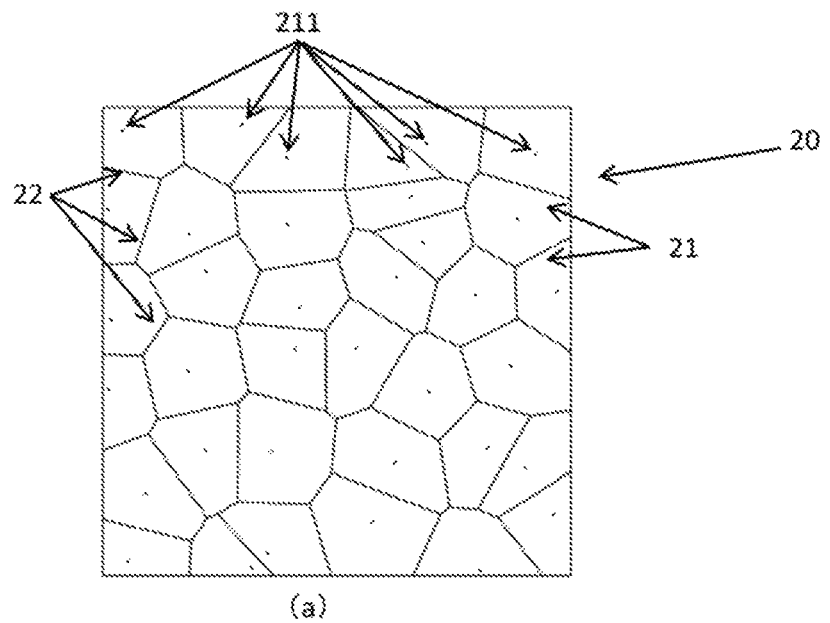
FIGS. 2A and 2B illustrate a Voronoi diagram.
Figure 2:
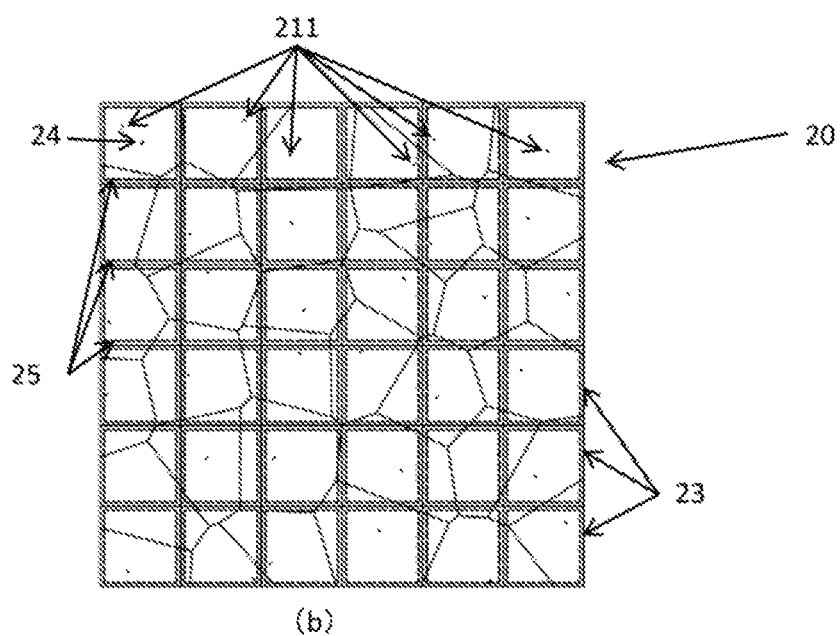

In the present invention, the sensor part 11 and the dummy part 12 are formed of a metal pattern having a mesh shape, and the metal mesh pattern has a shape obtained by enlarging or reducing, in an arbitrary direction, a mesh shape composed of Voronoi edges produced in relation to generators (hereinafter, referred to as a Voronoi diagram). The Voronoi diagram is a publicly known diagram applied in various fields including the field of information processing. FIG. 2 is for illustrating a Voronoi diagram used in the present invention. In FIG. 2a, generators 211 are arranged on a plane 20. The plane 20 is divided by boundary lines 22 in such a manner that a region 21 closest to a generator 211 is separated from other regions 21 each closest to a different generator 211. The boundary lines 22 each between two different regions 21 are called Voronoi edges. A Voronoi edge is a part of the perpendicular bisector of the line segment connecting a generator to an adjacent generator. A diagram formed of a collection of Voronoi edges is referred to as a Voronoi diagram.

Methods for disposing generators will be described referring to FIG. 2b. Methods for disposing generators include a method in which an arbitrary number of generators 211 are randomly disposed on a plane 20 and a method in which a plane 20 is divided into regions and an arbitrary number of generators 211 are randomly disposed in the regions. In the present invention, considering "grains", the latter method is preferred. Here, "grains" is a phenomenon in which high-density portions and low-density portions appear in the pattern of a random diagram. In the present invention, methods for dividing the plane 20 include a method in which the plane 20 is tiled using a plurality of polygons of a single kind or of two or more kinds (hereinafter, referred to as original polygons) and then the plane 20 is divided by the original polygons or a method in which the original polygons are enlarged or reduced to produce scaled polygons and then the plane 20 is divided by the scaled polygons. In the present invention, both methods are preferably used. It is preferred that, after dividing the plane 20 as described above, an arbitrary number of generators are randomly disposed in the original polygons or the scaled polygons. In FIG. 2b, the plane 20 is tiled using original polygons 23, which are squares, subsequently the original polygons are reduced so that the length of each side becomes 90% to produce reduced polygons 25, and then generators 211 are randomly disposed in the reduced polygons 25. In the present invention, in order to prevent the above-described "grains", preferred is tiling using original polygons 23 of a single kind as shown in FIG. 2b.

As the shape of the original polygon, preferred are a quadrangle, such as a square, a rectangle, and a rhombus; a triangle; and a hexagon. From the viewpoint of preventing the phenomenon of grains, preferred among them is a quadrangle, and particularly preferred is a rectangle of which the ratio of the longer side and the shorter side is 1:0.8 to 1:1. The length of one side of the original polygon is preferably 100 to 2000 µm, and more preferably 120 to 800 µm. As a method for producing scaled polygons of original polygons, preferred in the present invention is that all the original polygons 23 tiling a plane are enlarged or reduced at the same ratio in the same direction. In addition, it is preferred that the position of the scaled polygon is the same as the position of the original polygon. In the present invention, "the position of the scaled polygon is the same as the position of the original polygon" means that the position of the gravity center of the scaled polygon is the same as the position of the gravity center of the original polygon. In FIG. 2b, a scaled polygon 25 is obtained by reducing an original polygon 23 with respect to the gravity center 24 of the original polygon so that the length of each side becomes 90%. In the present invention, the ratio of the scaled polygon to the original polygon is such that the length of each scaled side is preferably 10 to 300%, and more preferably 60 to 200% of its original length. In the present invention, the number of generators 211 disposed in a scaled polygon is preferably 1 to 3, and preferably 1. In the present invention, the Voronoi edge is most preferably a straight line but a curved line, a wavy line, a zigzag line, etc. may also be used.

Figure 3:
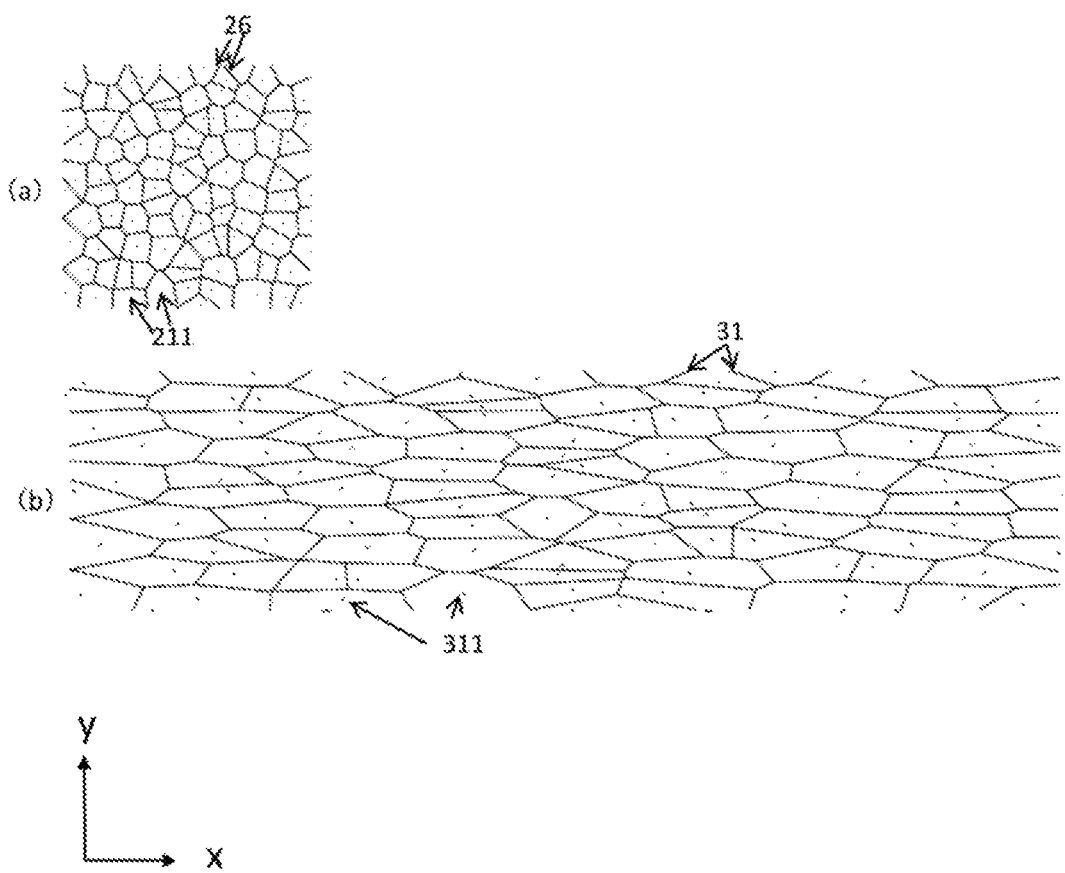
FIGS. 3A and 3B illustrate the enlargement or reduction of a Voronoi diagram.

Next, a diagram obtained by enlarging or reducing, in an arbitrary direction, a Voronoi diagram formed of Voronoi edges obtained by the method as described above will be described. FIG. 3 is for illustrating the enlargement or reduction of a Voronoi diagram in the present invention. FIG. 3a illustrates the Voronoi diagram before the enlargement or reduction. FIG. 3b shows a diagram obtained by enlarging the Voronoi diagram in FIG. 3a four times in the x direction, where scaling in the y direction is not performed. The Voronoi edges 26 in FIG. 3a correspond to the sides 31 in FIG. 3b, and the generators 211 in FIG. 3a correspond to the generators 311 in FIG. 3b. The diagram of FIG. 3b, which does not retain the above-described relation between generators and Voronoi edges, is not a Voronoi diagram. In FIG. 3, generators are shown for convenience, but such generators do not exist in the actual metal pattern of the sensor parts and/or the dummy parts.

As described above, the enlargement or reduction in the present invention means scaling of an original Voronoi diagram in a plane, for example, in the x direction and in the y direction at arbitrary ratios. When the distance between two points on the x axis of a Voronoi diagram is doubled by scaling of the diagram, the ratio in the x direction is 2, and when the distance is reduced to half, the ratio in the x direction is 0.5. The direction of the enlargement or reduction is preferably the first direction (the x direction), in which the sensor parts 11 extend, and/or the second direction (y direction), in which the sensor parts are arranged. When the ratio is more than 1, the scaling is referred to as enlargement, and when the ratio is less than 1, the scaling is referred to as reduction. In the present invention, the ratio of enlargement or reduction is preferably 0.3 to 5 (except for 1), and more preferably 0.5 to 3 (except for 1). Also preferred is that the ratio of enlargement or reduction in the first direction (the x direction), in which the sensor parts 11 extend, is greater than the ratio in the second direction (the y direction), in which the sensor parts 11 are arranged. Here, the comparison of two ratios means the comparison of the numerical values thereof. The line width of the thin lines of the sensor parts 11 and the dummy parts 12 is preferably 1 to 20 µm, more preferably 2 to 7 µm for achieving both conductivity and optical transparency.

As described above, when Voronoi edges are produced in the present invention, preferred is that, after a plane is divided into regions, an arbitrary number of generators are randomly disposed in the regions. Regarding the definition of the plane, the sensor parts 11 and the dummy parts 12 in FIG. 1 may be combined and the entire region may be regarded as the plane 20 in FIG. 2. Alternatively, the entire region may be divided into small regions and such a small region may be regarded as the plane 20 in FIG. 2. In the latter method, when all the small regions obtained by the division have the same size, it is possible to use, as a unit graphic, the thin line pattern of one of the regions. After adjustment is made so that the thin line pattern at the edge of the region connects to the pattern at the edge of the adjacent region to form Voronoi edges, tiling is performed using the unit graphic. Thus, a pattern that is regarded as a Voronoi diagram as a whole can be formed. In the present invention, a mesh pattern composed of a Voronoi diagram obtained as above may be enlarged or reduced in an arbitrary direction to form a metal pattern. Alternatively, the metal pattern of the present invention may be produced by enlarging or reducing the above-described region formed of the thin line pattern formed of Voronoi edges to obtain a unit graphic and then tiling is performed using the unit graphic.

Figure 4:
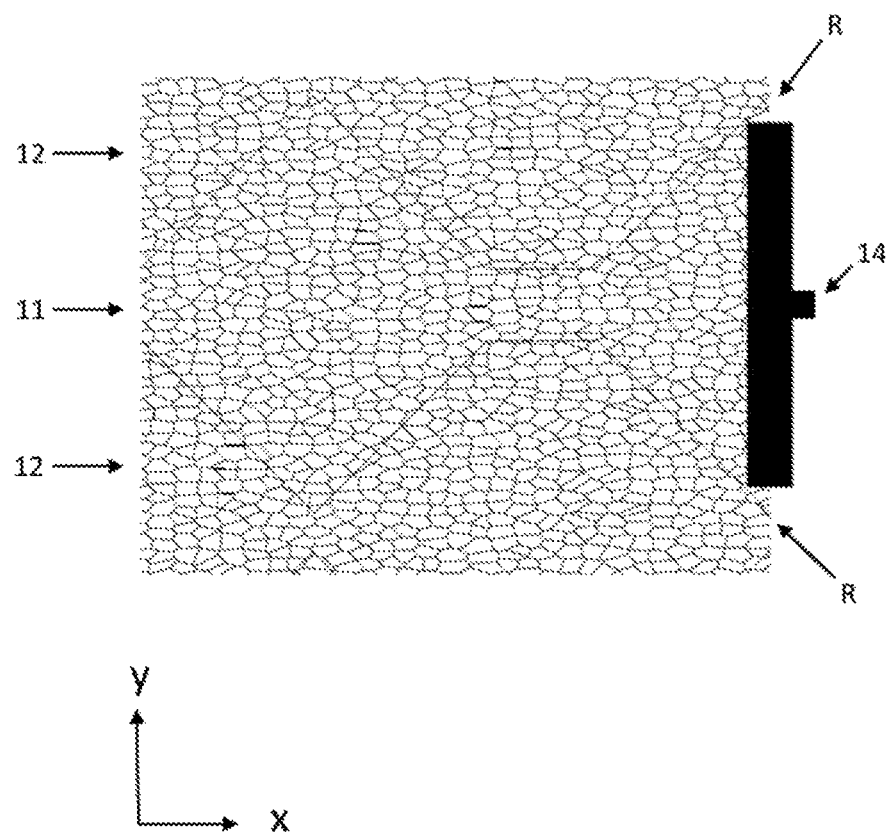
FIG. 4 is for illustrating line breaks.

As already described in the description of FIG. 1, there is no electrical connection between the sensor part and the dummy part. FIG. 4 is for illustrating line breaks. In FIG. 4, the metal pattern of the sensor part 11 and the dummy part 12 is formed of a diagram obtained by enlarging a Voronoi diagram at a ratio of 2 only in the x direction, and the sensor part 11 is electrically connected to the peripheral wire part 14 (the peripheral wire is further electrically connected to a terminal part not shown). As described above, in this figure, an imaginary boundary line R is shown on the boundary between the sensor part 11 and the dummy part 12, and on the imaginary boundary line R, line breaks are provided to the metal thin lines of the metal pattern so that the electrical connection between the sensor part 11 and the dummy part 12 is prevented. The length of the line break is preferably 3 to 100 μm, and more preferably 5 to 20 μm. In the metal pattern shown in FIG. 4, line breaks are provided only at positions on the imaginary boundary line R, but any number of additional line breaks may be provided at any locations in the dummy part 12.

In a touchscreen, an optically transparent conductive material having a metal pattern on an optically transparent support is disposed over a display. A color display generally has color pixels of three or more colors, and the pixels are arranged in accordance with a certain rule. In a liquid crystal display, an organic EL display, etc., pixels of the same color are sequentially arranged in a specific direction. Therefore, when a metal pattern exists along the direction, the pattern can hide only a specific color, resulting in a problem of color unevenness. Such a direction often coincides with the x direction or the y direction in FIG. 1. Also, in a random metal pattern, metal thin lines are randomly directed. Therefore, locally in the display screen, the metal pattern can coincide with the specific direction in which pixels of the same color are sequentially arranged, resulting in color unevenness alike.

In the present invention, for reduced color unevenness, it is preferred that, among the sides forming the metal pattern, a relatively long side located along the specific direction in which pixels of the same color are sequentially arranged is replaced with two or more shorter sides located in different directions to reconstitute the metal pattern. Specifically, it is preferred that, among all the sides forming the metal pattern, 90% or more of sides each having a length of 0.2 mm or more and an angle of less than 15° to the direction in which pixels of the same color are sequentially arranged are replaced with two or more sides each having an angle of 15° or more to the direction to obtain another metal pattern.

In the present invention, the sensor part 11 and the dummy part 12 are formed of a metal pattern having a mesh shape. The metal is preferably gold, silver, copper, nickel, aluminum, and a composite material thereof. From the viewpoint of production efficiency, it is preferred that the peripheral wire part 14 and the terminal part 15 also have a pattern made of a metal having the same composition as that of the sensor part 11 and the dummy part 12. As the method for forming the metal patterns, publicly known methods can be used, and the examples thereof include a method in which a silver halide photosensitive material is used; a method in which, after a silver image is obtained by the aforementioned method, electroless plating or electrolytic plating of the silver image is performed; a method in which screen printing with use of a conductive ink, such as a silver paste and a copper paste, is performed; a method in which inkjet printing with use of a conductive ink, such as a silver ink and a copper ink, is performed; a method in which the metal pattern is obtained by forming a conductive layer by evaporation coating or sputtering, forming a resist film thereon, exposing, developing, etching, and removing the resist layer; and a method in which a metal pattern is obtained by placing a metal foil, such as a copper foil, making a resist film thereon, exposing, developing, etching, and removing the resist layer. Among them, the silver halide diffusion transfer process is preferred for easily forming an extremely microscopic metal pattern and for allowing reduction in the thickness of the metal pattern to be produced.

If the metal pattern produced by any of the above-mentioned procedures is too thick, the subsequent processes (for example, adhesion to another member etc.) may become difficult to carry out, and if the metal pattern is too thin, the conductivity required of touchscreens can hardly be achieved. Therefore, the thickness is preferably 0.01 to 5 μm, and more preferably 0.05 to 1 μm.

In the optically transparent conductive material of the present invention, the total light transmittance of the sensor parts 11 and the dummy parts 12 is preferably 80% or higher, more preferably 85% or higher, and particularly preferably 88.5% or higher. The difference in the total light transmittance between the sensor parts 11 and the dummy parts 12 is preferably within 0.5%, more preferably within 0.1%, and further more preferred is that the total light transmittance of the sensor parts 11 is equal to that of the dummy parts 12. The sensor parts 11 and the dummy parts 12 each preferably have a haze value of 2 or less. Also, regarding the color phase of the sensor parts 11 and the dummy parts 12, the b*value in the CIELAB color space is preferably 2 or less, and more preferably 1 or less.

As the optically transparent support of the optically transparent conductive material, a publicly known support which has optical transparency and which is made of, for example, glass, a polyester resin such as polyethylene terephthalate (PET) or polyethylene naphthalate (PEN), an acrylate resin, an epoxy resin, a fluororesin, a silicone resin, a polycarbonate resin, a diacetate resin, a triacetate resin, a polyarylate resin, polyvinyl chloride, a polysulfone resin, a polyether sulfone resin, a polyimide resin, a polyimide resin, a polyolefine resin, a cyclic polyolefin resin, or the like is preferably used. Here, "optically transparent" means that the total light transmittance is 60% or higher, and the total light transmittance is preferably 80% or higher. The thickness of the optically transparent support is preferably 50 μm to 5 mm. Also, the optically transparent support may be provided with a publicly known layer, such as an antifingerprint layer, a hard coat layer, an antireflection layer, and an antiglare layer.

Examples

Hereinafter, the present invention will be illustrated in more detail by Examples, but the present invention is not limited thereto and can be embodied in various ways within the scope of the invention.

<Optically Transparent Conductive Material 1>

As an optically transparent support, a 100-μm-thick polyethylene terephthalate film was used. The total light transmittance of this optically transparent support was 91%.

Next, in accordance with the following formulation, a physical development nuclei coating liquid was prepared, applied onto the optically transparent support, and dried to provide a physical development nuclei layer.

| Liquid A | Palladium chloride | 5 g |
| | Hydrochloric acid | 40 mL |
| | Distilled water | 1000 mL |
| Liquid B | Sodium sulfide | 8.6 g |
| | Distilled water | 1000 mL |

<Preparation of Palladium Sulfide Sol>

Liquid A and Liquid B were mixed with stirring, and after 30 minutes, passed through a column filled up with an ion exchange resin to give a palladium sulfide sol.

<Preparation of Physical Development Nuclei Coating Liquid>
per m² of silver halide photosensitive material

| The above-prepared palladium sulfide sol | 0.4 mg |
| 2 mass % glyoxal aqueous solution | 0.2 mL |
| Surfactant (S-1) | 4 mg |
| Polyethylene glycol diglycidyl ether (Denacol EX-830 made by Nagase Chemtex Corp.) | 50 mg |
| 10 mass % polyethyleneimine aqueous solution (SP-200 made by Nippon Shokubai Co., Ltd.; average molecular weight: 10,000) | 0.5 mg |

Subsequently, an intermediate layer, a silver halide emulsion layer, and a protective layer, of which the compositions are shown below, were applied in this order (from closest to the optically transparent support) onto the above physical development nuclei layer, and dried to give a silver halide photosensitive material. The silver halide emulsion was produced by a general double jet mixing method for photographic silver halide emulsions. The silver halide emulsion was prepared using 95 mol % of silver chloride and 5 mol % of silver bromide so as to have an average particle diameter of 0.15 μm. The obtained silver halide emulsion was subjected to gold and sulfur sensitization using sodium thiosulfate and chloroauric acid by the usual method. The silver halide emulsion obtained in this way contained 0.5 g of gelatin per gram of silver.

<Composition of Intermediate Layer>
per m² of silver halide photosensitive material

| Gelatin | 0.5 g |
| Surfactant (S-1) | 5 mg |
| Dye 1 | 50 mg |

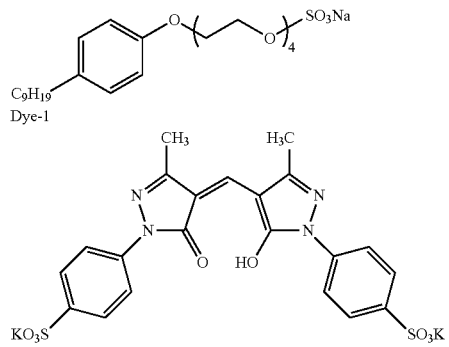

S-1

Dye-1

<Composition of Silver Halide Emulsion Layer>
per m² of silver halide photosensitive material

| Gelatin | 0.5 g |
| Silver halide emulsion | Equivalent of 3.0 g of silver |

-continued

| 1-Phenyl-5-mercaptotetrazole | 3 mg |
| Surfactant (S-1) | 20 mg |

<Composition of Protective Layer>
per m² of silver halide photosensitive material

| Gelatin | 1 g |
| Amorphous silica matting agent (average particle diameter: 3.5 μm) | 10 mg |
| Surfactant (S-1) | 10 mg |

Figure 5:
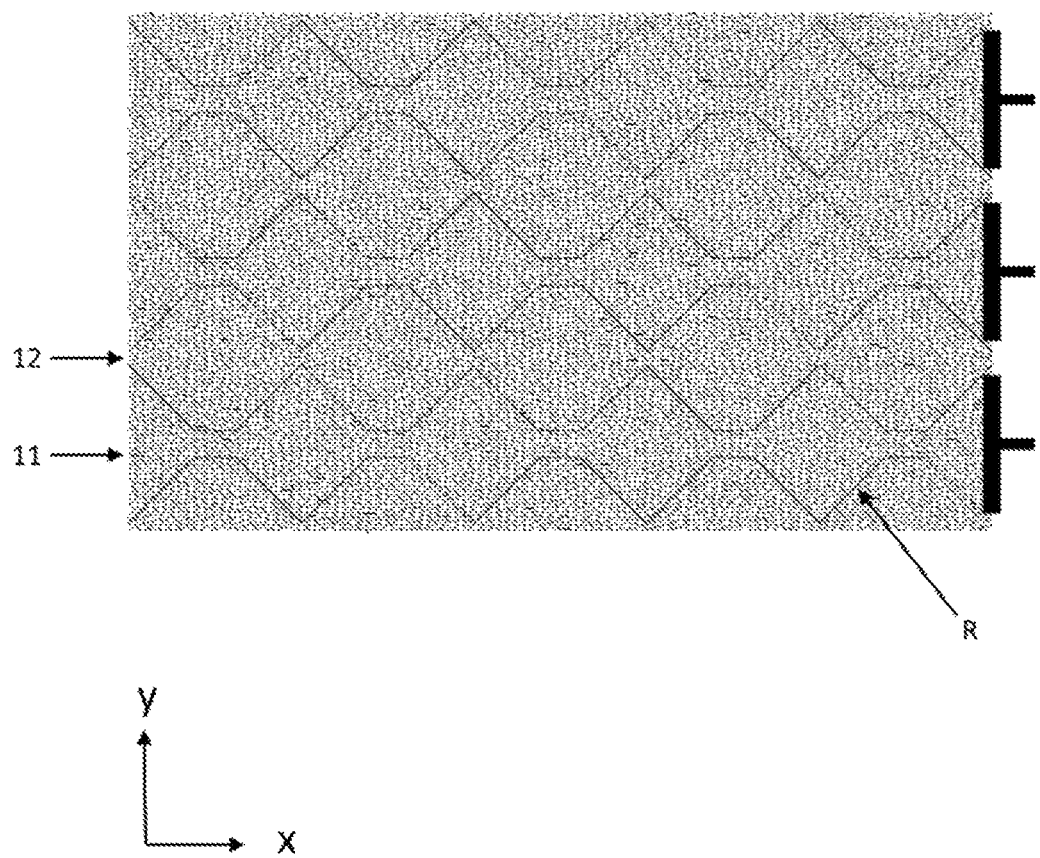
FIG. 5 is an enlarged view of the transparent manuscript used in the Examples.

The silver halide photosensitive material obtained as above was brought into close contact with a transparent manuscript having the pattern image shown in FIG. 1, and exposure was performed, through a resin filter which cuts off light of 400 nm or less, using a contact printer having a mercury lamp as a light source. In the transparent manuscript, the cycle L and the cycle M are both 5 mm. FIG. 5 is an enlarged view of the transparent manuscript used in the Examples (in FIG. 5, an imaginary boundary line R is shown to indicate the location of line breaks provided on the boundary between the sensor part and the dummy part). The mesh pattern of the sensor part 11 and the dummy part 12 in FIG. 5 was produced as follows. Tiling was performed using squares of which the length of one side was 200 μm, and then, in each of the 80%-sized reduced squares thereof, a generator was randomly arranged to obtain a Voronoi diagram. The Voronoi diagram was enlarged only in the x direction at a ratio of 2. The line width in the enlarged diagram was 5 μm. Thin lines on the boundary between the sensor parts and the dummy parts are provided with line breaks 20 μm in length. The total light transmittance of the sensor parts was 88.9%, and the total light transmittance of the dummy parts was 88.9%.

After immersion in the diffusion transfer developer shown below at 20° C. for 60 seconds, the silver halide emulsion layer, the intermediate layer, and the protective layer were washed off with warm water at 40° C., and a drying process was performed. By repeating this process 100 times, 100 sheets of the optically transparent conductive material 1 having a metal silver image of the pattern of FIG. 1 and FIG. 5 as an optically transparent conductive layer were obtained. The metal silver image of the optically transparent conductive layer of the obtained optically transparent conductive material had the same shape and line width as those of the transparent manuscript having the pattern shown in FIG. 1 and FIG. 5. The film thickness of the metal silver image measured with a confocal microscope was 0.1 μm.

<Composition of Diffusion Transfer Developer>

| Potassium hydroxide | 25 g |
| Hydroquinone | 18 g |
| 1-Phenyl-3-pyrazolidone | 2 g |
| Potassium sulfite | 80 g |
| N-methylethanolamine | 15 g |
| Potassium bromide | 1.2 g |

Water was added to the above ingredients to make the total volume of 1000 mL, and the pH was adjusted to 12.2.

<Optically Transparent Conductive Material 2>

The same procedure was performed as in the preparation for the optically transparent conductive material 1 using a transparent manuscript having the pattern of FIG. 1 except that the enlargement ratio in the x direction for producing the mesh pattern was changed to 1.5, and 100 sheets of the optically transparent conductive material 2 were obtained. The line width of the pattern was the same as that of the optically transparent conductive material 1, but the total light transmittance of the sensor parts was 88.6%, and the total light transmittance of the dummy parts was 88.6%.

<Optically Transparent Conductive Material 3>

The same procedure was performed as in the preparation for the optically transparent conductive material 1 except for using a different transparent manuscript to obtain 100 sheets of the optically transparent conductive material 3. The pattern of the transparent manuscript had the pattern of FIG. 1 and the mesh pattern was produced as described below. In the production of the mesh pattern, tiling was performed using squares of which the length of one side was 250 µm, and then, in each of the 80%-sized reduced squares thereof, a generator was randomly arranged to produce a Voronoi diagram. The Voronoi diagram was not enlarged or reduced. The line width of the pattern and the total light transmittance were the same as those of the optically transparent conductive material 1.

<Optically Transparent Conductive Material 4>

The same procedure was performed as in the preparation for the optically transparent conductive material 1 except for using a different transparent manuscript to obtain 100 sheets of the optically transparent conductive material 4. The pattern of the transparent manuscript had the pattern of FIG. 1 and the mesh pattern was produced as described below. In the production of the mesh pattern, tiling was performed using squares of which the length of one side was 200 µm, and then, in each of the 80%-sized reduced squares thereof, a generator was randomly arranged to produce a Voronoi diagram. The Voronoi diagram was not enlarged or reduced. The line width of the pattern was the same as that of the optically transparent conductive material 1, but the total light transmittance of the sensor parts was 88.0%, and the total light transmittance of the dummy parts was 88.0%.

<Optically Transparent Conductive Material 5>

The same procedure was performed as in the preparation for the optically transparent conductive material 1 except for using a different transparent manuscript to obtain 100 sheets of the optically transparent conductive material 5. The pattern of the transparent manuscript had the pattern of FIG. 1 and the mesh pattern was produced as described below. In the production of the mesh pattern, tiling was performed using squares of which the length of one side was 300 µm, and then, in each of the 80%-sized reduced squares thereof, a generator was randomly arranged to produce a Voronoi diagram. The Voronoi diagram was enlarged in the x direction at a ratio of 3 and reduced in the y direction at a ratio of 0.7. The line width of the pattern was the same as that of the optically transparent conductive material 1, but the total light transmittance of the sensor parts was 89.5%, and the total light transmittance of the dummy parts was 89.5%.

<Optically Transparent Conductive Material 6>

The same procedure was performed as in the preparation for the optically transparent conductive material 1 except for using a different transparent manuscript to obtain 100 sheets of the optically transparent conductive material 6. The pattern of the transparent manuscript had the pattern of FIG. 1 and the mesh pattern was produced as described below. In the production of the mesh pattern, tiling was performed using squares of which the length of one side was 300 µm, and then, in each of the 80%-sized reduced squares thereof, a generator was randomly arranged to produce a Voronoi diagram. The Voronoi diagram was not enlarged or reduced. The line width of the pattern was the same as that of the optically transparent conductive material 1, but the total light transmittance of the sensor parts was 89.5%, and the total light transmittance of the dummy parts was 89.5%.

<Optically Transparent Conductive Material 7>

The same procedure was performed as in the preparation for the optically transparent conductive material 1 except for using a different transparent manuscript to obtain 100 sheets of the optically transparent conductive material 7. The pattern of the transparent manuscript had the pattern of FIG. 1 and the mesh pattern was produced as described below. In the production of the mesh pattern, tiling was performed using rectangles of which the length of one side in the x direction was 300 µm and the length of one side in the y-direction was 200 µm, and then, in each of the 80%-sized reduced rectangles thereof, a generator was randomly arranged to produce a Voronoi diagram. The Voronoi diagram was not enlarged or reduced. The line width of the pattern was the same as that of the optically transparent conductive material 1, but the total light transmittance of the sensor parts was 88.8%, and the total light transmittance of the dummy parts was 88.8%.

The visibility and the reliability of the obtained optically transparent conductive materials 1 to 7 were evaluated in accordance with the procedure shown below. The results and the total light transmittance are shown in Table 1.

<Visibility>

From the obtained 100 sheets each of the optically transparent conductive materials 1 to 7, one sheet each was randomly chosen and was placed on the screen of a 23" wide LCD monitor (Flatron23EN43V-B2 made by LG Electronics) displaying solid white, and the visibility was evaluated based on the following criteria. The level at which moire or grain was obvious was defined as "C", the level at which moire or grain was noticeable as a result of close inspection was defined as "B", and the level at which moire or grain was unnoticeable was defined as "A".

<Reliability>

The obtained 100 sheets each of the optically transparent conductive materials 1 to 7 were left in the environment of a temperature of 85° C. and a relative humidity of 95% for 800 hours. The continuity between all the pairs of terminal parts 15 in FIG. 1 supposed to be electrically connected with each other through the sensor part 11 was checked, and the rate of non-defective sheets having continuity between all the pairs of terminal parts was determined.

TABLE 1

| | Total light transmittance | Visibility | Reliability | Note |
|---|---|---|---|---|
| Optically transparent conductive material 1 | 88.9% | A | 100% | Present invention |
| Optically transparent conductive material 2 | 88.6% | A | 100% | Present invention |
| Optically transparent conductive material 3 | 88.9% | A | 80% | Comparative Example |
| Optically transparent conductive material 4 | 88.0% | A | 100% | Comparative Example |
| Optically transparent conductive material 5 | 89.5% | A | 95% | Present invention |
| Optically transparent conductive material 6 | 89.5% | A | 70% | Comparative Example |
| Optically transparent conductive material 7 | 88.8% | A | 85% | Comparative Example |

The optically transparent conductive materials of the present invention have exceptional properties, i.e., in addition to desirable visibility, a total light transmittance of 88.5% or higher and a reliability of 95% or higher. In contrast, the optically transparent conductive materials of the comparative examples have desirable visibility but are inferior in total light transmittance and/or reliability. The results in FIG. 1 show that the present invention provides an optically transparent conductive material which does not cause moire even when placed over a liquid crystal display and which has a favorable light transmittance and a high reliability.

REFERENCE SIGNS LIST

1 Optically transparent conductive material
2 Optically transparent support
11 Sensor part
12 Dummy part
13 Non-image part
14 Peripheral wire part
15 Terminal part
20 Plane
21 Region
22 Boundary line of region
23 Original polygon
24 Gravity center of original polygon
25 Reduced polygon
211 Generator
R Imaginary boundary line

The invention claimed is:

1. An optically transparent conductive material, comprising:
    an optically transparent support bearing an optically transparent conductive layer, said optically transparent conductive layer having a sensor part electrically connected to a terminal part and a dummy part not electrically connected to the terminal part,
    the sensor part and/or the dummy part being formed of a metal pattern having a mesh shape obtained by enlargement or reduction of a Voronoi diagram in an arbitrary direction, wherein
    all of the mesh shapes of the metal pattern are mesh shapes obtained by the same ratio of enlargement or reduction of the Voronoi diagram in said arbitrary direction,
    the Voronoi diagram is composed of Voronoi edges such that a plane for the Voronoi diagram is tiled using a plurality of polygons of a single kind or polygons of two or more kinds,
    the plurality of polygons each having a gravity center at a position, and the enlargement or reduction of the plurality of polygons providing a plurality of associated scaled polygons, each of the plurality of scaled polygons also having a gravity center at a position,
    the position of the gravity center of each of said polygons is the same as the position of the gravity center of its associated scaled polygon,
    a ratio of the associated scaled polygon to said polygon is such that the length of each scaled side is 10 to 300% of the corresponding side of said polygon,
    a number of generators randomly disposed in each of the scaled polygons is 1 to 3, and
    the Voroni edges are produced in relation to the generators.

2. The optically transparent conductive material of claim 1, wherein the sensor part is formed of a column electrode having a contour shape extending in a first direction in the plane of the optically transparent conductive layer, wherein
    a plurality of column electrodes are arranged in a second direction such that every two sensor parts sandwich a dummy part, and
    said arbitrary direction of enlargement or reduction is the first and/or the second direction.

3. The optically transparent conductive material of claim 2, wherein the ratio of enlargement or reduction in the first direction is greater than the ratio of enlargement or reduction in the second direction.

4. The optically transparent conductive material of claim 1, wherein the ratio of enlargement or reduction in said arbitrary direction is 0.3 to 5, with the proviso that the ratio of enlargement or reduction is not 1.

5. The optically transparent conductive material of claim 1, wherein the ratio of enlargement or reduction in said arbitrary direction is 0.5 to 3, with the proviso that the ratio of enlargement or reduction is not 1.

6. The optically transparent conductive material of claim 1, wherein the polygon is a single kind.

7. The optically transparent conductive material of claim 6, wherein the polygon is a rectangle having a ratio of the longer side to the shorter side of 1:0.8 to 1:1.

8. The optically transparent conductive material of claim 1, wherein the ratio of the scaled polygon to said polygon is such that the length of each scaled side is 60 to 200% of the corresponding side of said polygon.

9. The optically transparent conductive material of claim 1, wherein the number of generators disposed in the scaled polygon is 1.

10. The optically transparent conductive material of claim 1, wherein a total light transmittance of the sensor parts and the dummy parts is at least 88.5%.

* * * * *